US010861659B1

(12) United States Patent
Chen et al.

(10) Patent No.: US 10,861,659 B1
(45) Date of Patent: Dec. 8, 2020

(54) TOUCH INPUT DEVICE

(71) Applicant: SUNREX TECHNOLOGY CORP., Taichung (TW)

(72) Inventors: Chun-Chieh Chen, Taichung (TW); Yi-Wen Tsai, Taichung (TW); Ching-Yao Huang, Taichung (TW); Ling-Cheng Tseng, Taichung (TW)

(73) Assignee: SUNREX TECHNOLOGY CORP., Taichung (TW)

( * ) Notice: Subject to any disclaimer, the term of this patent is extended or adjusted under 35 U.S.C. 154(b) by 0 days.

(21) Appl. No.: 16/812,733

(22) Filed: Mar. 9, 2020

(30) Foreign Application Priority Data

Nov. 19, 2019 (TW) .............................. 108141894 A

(51) Int. Cl.
*H01H 21/24* (2006.01)
*G06F 1/16* (2006.01)

(52) U.S. Cl.
CPC .............. *H01H 21/24* (2013.01); *G06F 1/169* (2013.01); *H01H 2221/044* (2013.01); *H01H 2231/002* (2013.01)

(58) Field of Classification Search
CPC ............. H01H 21/24; H01H 2221/044; H01H 2231/002; G06F 1/169

USPC ......................................... 200/295, 512, 600
See application file for complete search history.

(56) References Cited

U.S. PATENT DOCUMENTS

| 2019/0317602 A1* | 10/2019 | Chen et al. | ............... | G06F 3/01 200/295 |
| 2019/0317619 A1* | 10/2019 | Chen et al. | ............. | G06F 3/041 200/295 |

\* cited by examiner

*Primary Examiner* — Nguyen Tran
*Assistant Examiner* — Iman Malakooti
(74) *Attorney, Agent, or Firm* — Burris Law, PLLC

(57) ABSTRACT

A touch input device includes a base board, a circuit module having a free end portion and a connecting end portion, a metallic connecting member and an annular, metallic frame. The connecting member includes a positioning portion fixedly mounted to the connecting end portion of the circuit module, and an elastic arm extending from the positioning portion away from the connecting end portion and toward a free end portion in such a way to define a coupling groove that indents away therefrom. The frame is spaced apart from the circuit module and includes a coupling portion that is embossed from a side of the frame proximate to the connecting member, and that has a coupling block coupled to the coupling groove of the elastic arm.

6 Claims, 7 Drawing Sheets

TOUCH INPUT DEVICE

CROSS-REFERENCE TO RELATED APPLICATION

This application claims priority of Taiwanese Patent Application No. 108141894, filed on Nov. 19, 2019.

FIELD

The disclosure relates to a human-computer interface device, and more particularly to a touch input device.

BACKGROUND

Referring to FIG. 1, a conventional touchpad 9 is adapted to be used on a laptop as an input device. The touchpad 9 has a base 91, a circuit board 92 connected to a bottom surface of the base 91, a pushbutton switch 93 and a foam sheet 94 respectively connected to two opposite ends of a bottom surface of the circuit board 92, and an assembly frame 95 having a connecting end connected to a bottom end of the foam sheet 94 and an open end proximate to the pushbutton switch 93. By pressing the base 91 of the touchpad 9, the end of the circuit board 92 that is connected to the foam sheet 94 acts as the axis of rotation of the circuit board 92 relative to the assembly frame 95, such that the pushbutton switch 93 may be pushed to be close by the circuit board 92 and the open end of the assembly frame 95.

However, the foam sheet 94 can easily deteriorate over time, which alters distance between the connecting end of the assembly frame 95 and the end of the circuit board 92 proximate thereto. In addition, overuse of the touchpad 9 reduces restoring force of the foam sheet 94, such that the touchpad 9 becomes less comfortable to press.

SUMMARY

Therefore, an object of the disclosure is to provide a touch input device that can alleviate the drawback of the prior art.

According to the disclosure, the touch input device includes a base board, a circuit module, a metallic connecting member and an annular, metallic frame. The base board includes a touch input surface on one side thereof. The circuit module includes a circuit board that is connected to and disposed to the other side of the base board opposite to the touch input surface, and a pushbutton switch that is mounted to the free end portion of the circuit board. The circuit board has a first surface facing away from the base board and having a free end portion and a connecting end portion opposite to the free end portion in a front-rear direction. The pushbutton switch protrudes away from the circuit board in a pressing direction.

The metallic connecting member includes a positioning portion that is fixedly mounted to the connecting end portion of the first surface of the circuit board, and at least one elastic arm that is connected to the positioning portion. The at least one elastic arm has a first extending section extending from the positioning portion away from the circuit board in the pressing direction, a second extending section extending from the first extending portion toward the free end portion in the front-rear direction, and a third extending section extending from the second extending portion toward the circuit board. The first, second, and third extending sections cooperatively define a coupling groove that indents away from the circuit board.

The frame is spaced apart from the circuit board and includes a front frame portion that corresponds in position to the free end portion of the first surface of the circuit board, a rear frame portion that corresponds in position to the connecting end portion of the first surface of the circuit board, two spaced-apart side frame portions that interconnect the front and rear frame portions, and a coupling portion that is embossed from a side of the rear frame portion proximate to the connecting member, and that has at least one through groove for the first extending section of the at least one elastic arm to extend therethrough, and at least one coupling block proximate to a front end of the at least one through groove and coupled to the at least one coupling groove of the at least one elastic arm.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
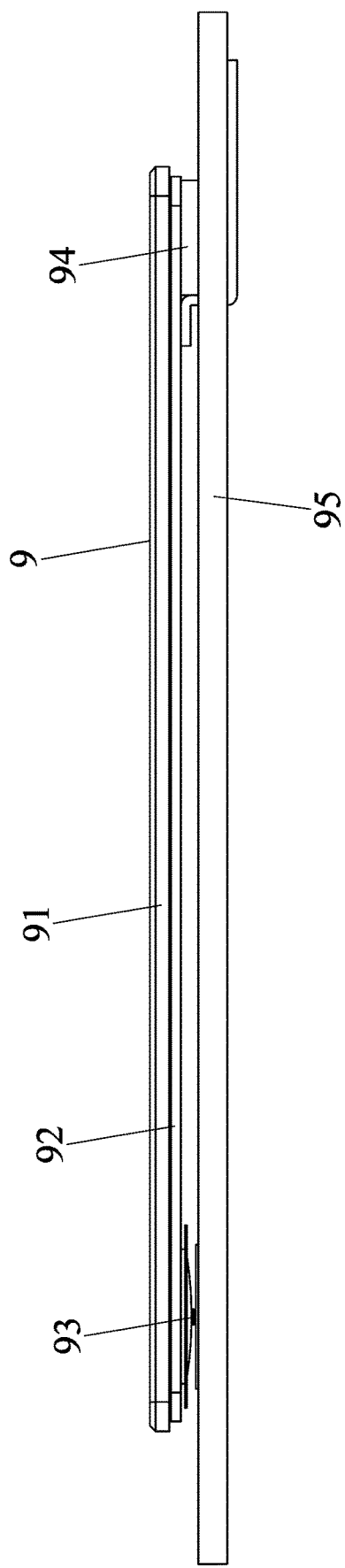
FIG. 1 is a side view of a conventional touchpad.
Figure 2:
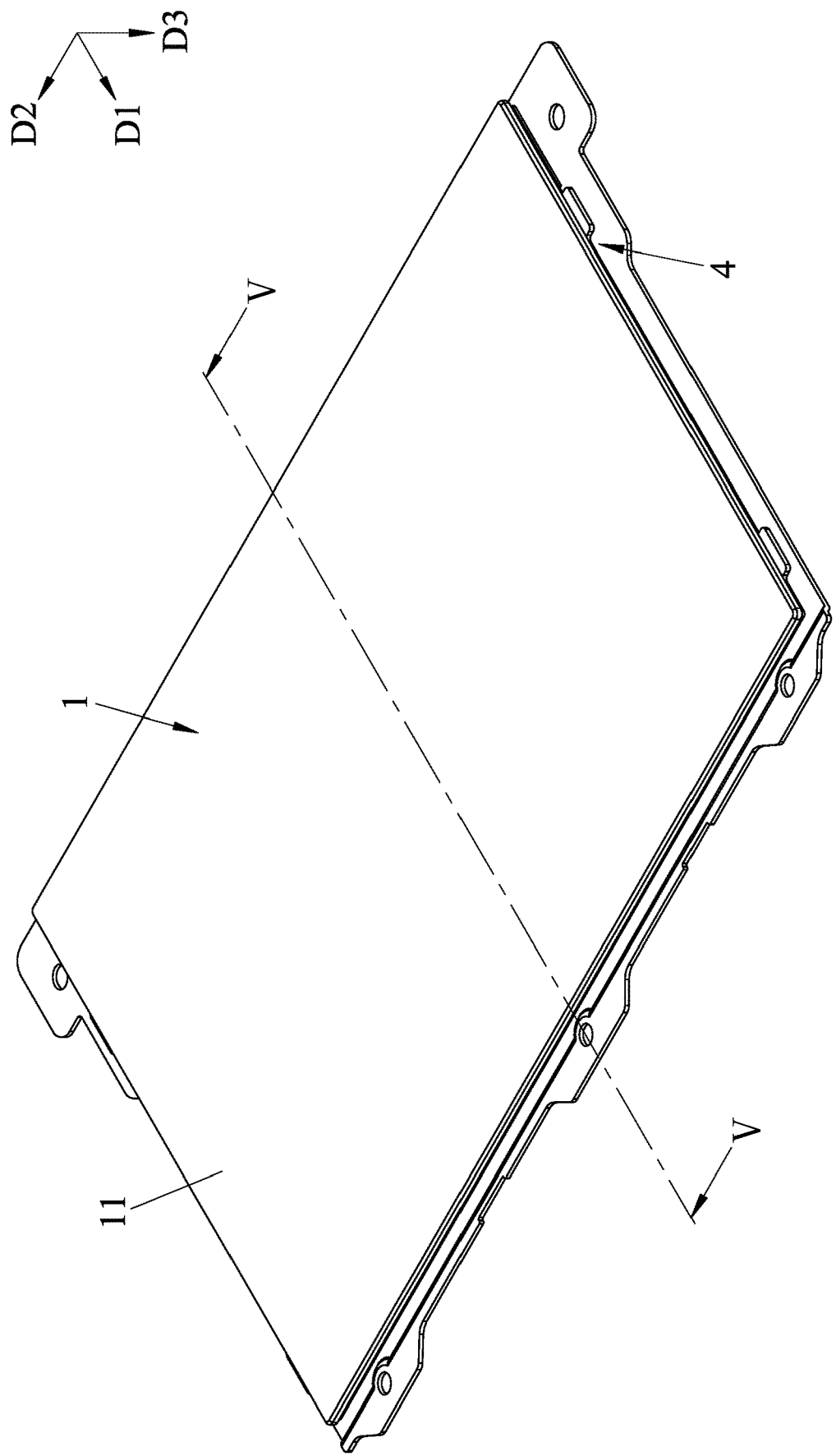
FIG. 2 is perspective view of an embodiment of the touch input device according to the disclosure.
Figure 3:
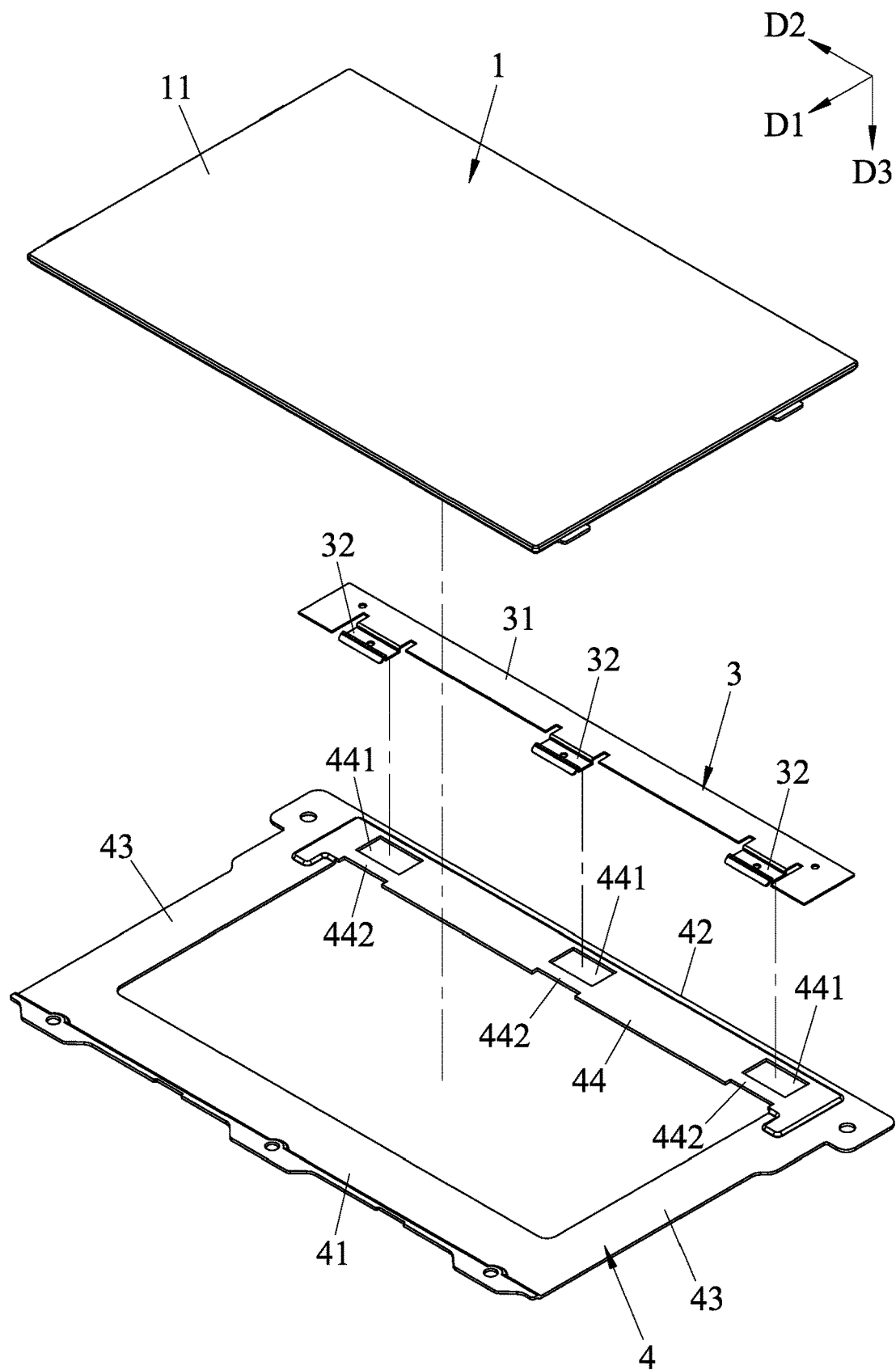
FIG. 3 is a partly exploded perspective view of the embodiment.
Figure 4:
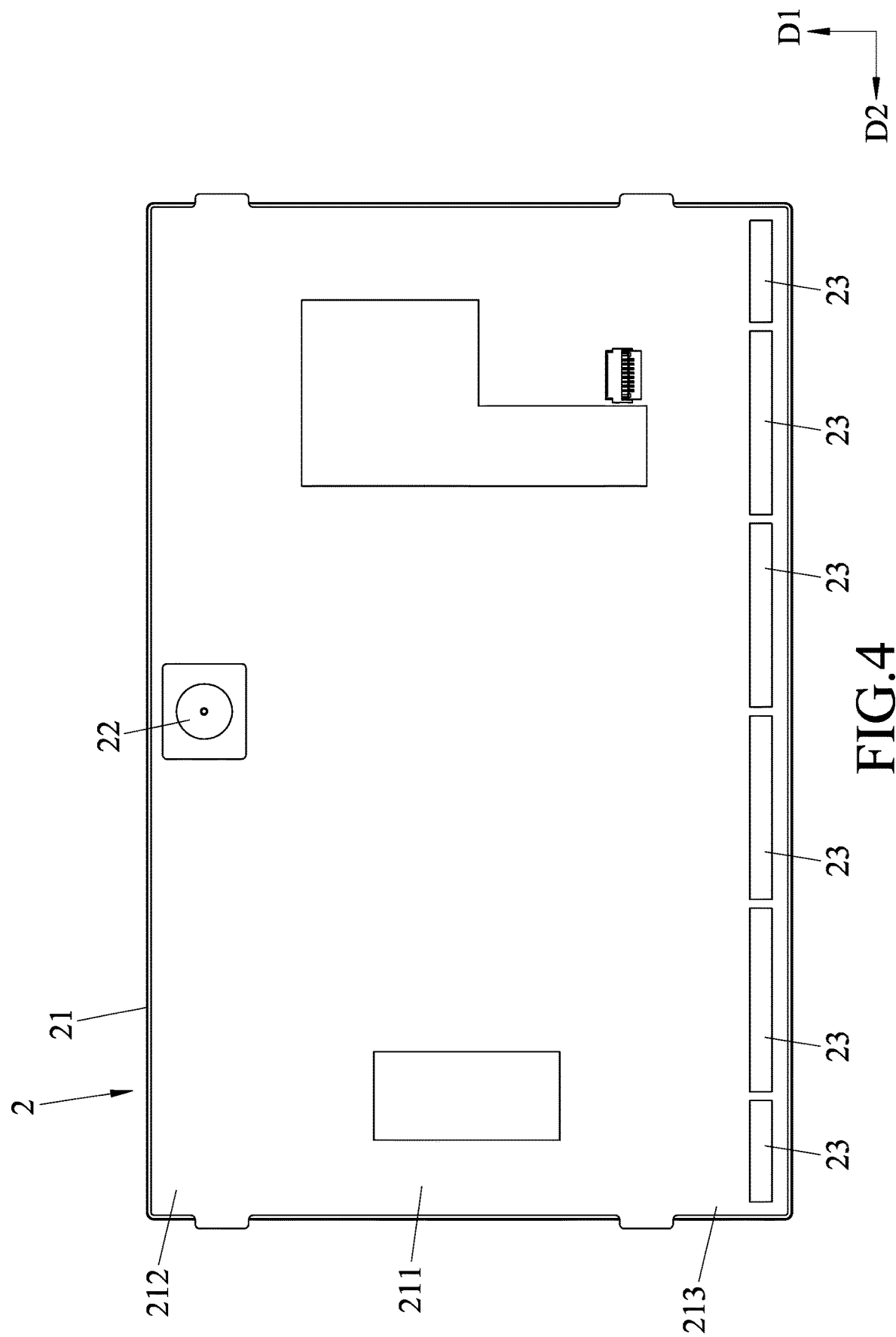
FIG. 4 is a bottom view of a circuit module of the embodiment.

Referring to FIGS. 2 to 4, an embodiment of a touch input device according to the disclosure includes a base board 1, a circuit module 2 (see FIG. 4), a metallic connecting member 3, and an annular, metallic frame 4. In the embodiment, the base board 1, the circuit module 2, the connecting member 3 and the frame 4 are arranged in a pressing direction (D3).

Figure 5:
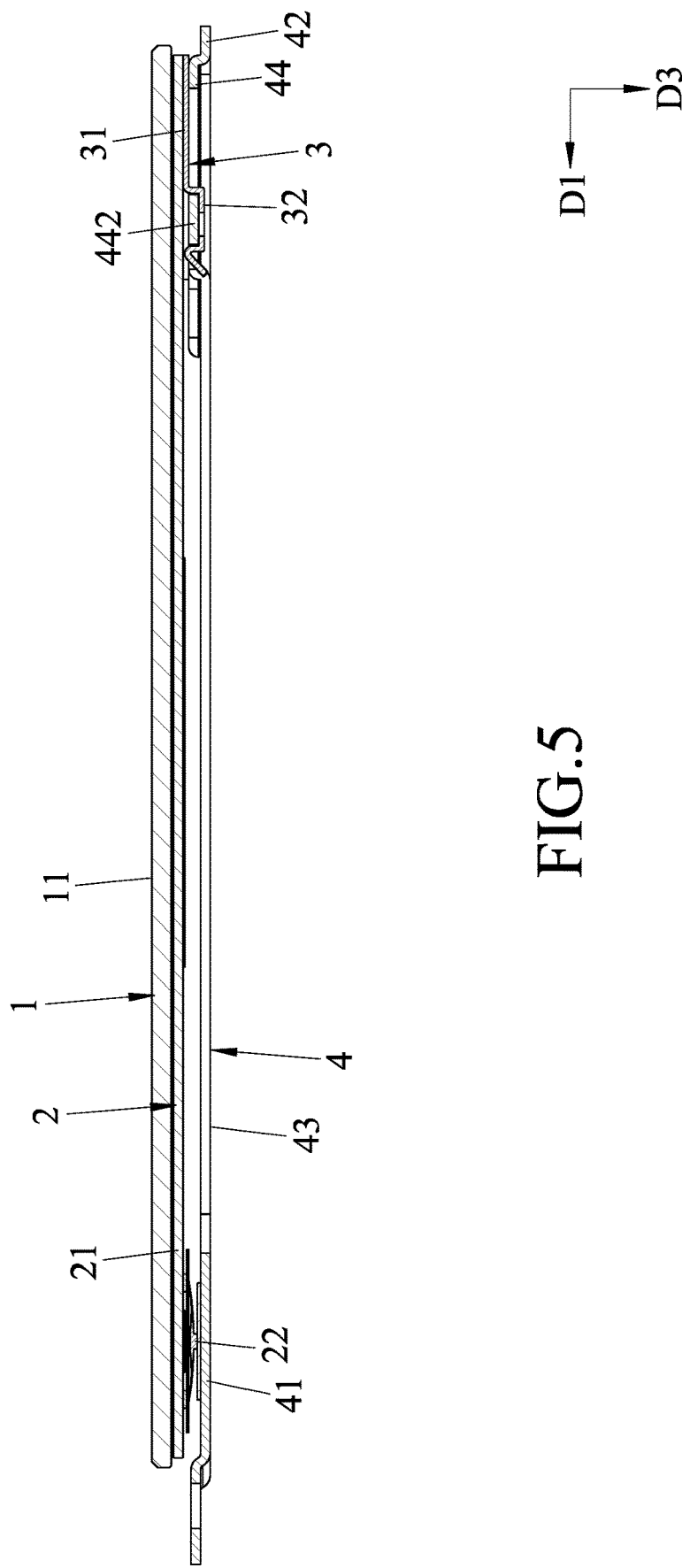
FIG. 5 is a sectional view taken along line V-V in FIG. 2.

Referring to FIGS. 3 to 5, the base board 1 includes an touch input surface 11 on one side thereof. The circuit module 2 includes a circuit board 21, a pushbutton module 22, and at least one earthing electrode 23. The circuit board 21 is connected to and disposed to the other side of the baseboard 1 opposite to the touch input surface 11, and has a first surface 211 facing away from the base board 1. The first surface 211 has a free end portion 212 and a connecting end portion 213 opposite to the free end portion 212 in a front-rear direction (D1). The pushbutton switch 22 is mounted to the free end portion 212 of the circuit board 21, and protrudes away from the circuit board 21 in the pressing direction (D3). The at least one earthing electrode 23 is mounted to the connecting end portion 213. In this embodiment, the circuit module 2 includes six of the earthing electrodes 23, but the number may vary in other embodiments.

The connecting member 3 includes a positioning portion 31 that is fixedly mounted to the connecting end portion 213 of the first surface 211 of the circuit board 21, and at least one elastic arm 32 that is connected to the positioning portion 31. In this embodiment, the positioning portion 31 is fixedly mounted to the connecting end portion 213 via welding to be electrically connected to the earthing electrodes 23, and the connecting member 3 includes three of the elastic arms 32 that are spaced apart from each other in a lateral direction (D2) orthogonal to the front-rear direction (D1). However, the method for mounting the positioning portion 31 and the number of the elastic arms 32 may vary in other embodiments.

Figure 6:
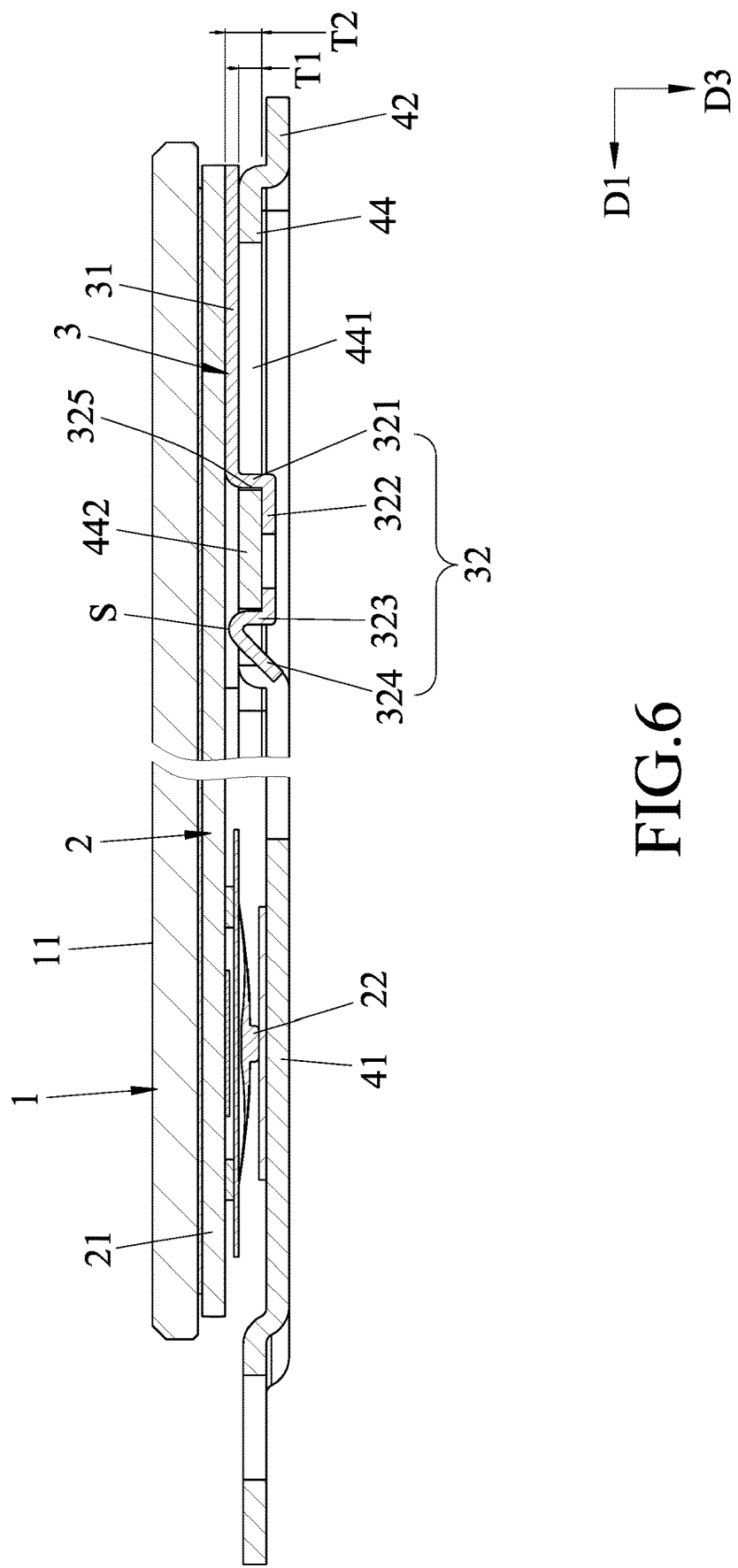
FIG. 6 is a enlarged, fragmentary sectional view taken along line V-V in FIG. 1, illustrating the circuit module in a default position.

Referring to FIG. 6, each of the elastic arms 32 has a first extending section 321 extending from the positioning portion 31 away from the circuit board 21 in the pressing direction (D3), a second extending section 322 extending from the first extending portion 321 toward the free end portion 212 in the front-rear direction (D1), a third extending section 323 extending from the second extending portion 322 toward the circuit board 21, and a guiding section 324 that extends from the third extending section 323 away from the positioning portion 31 and away from the circuit board 21. The first, second, and third extending sections 321, 322, 323 cooperatively define a coupling groove 325 that indents away from the circuit board 21. The third extending section 323 and the circuit board 21 cooperatively define an assembling gap (S) therebetween.

Referring back to FIGS. 3, 4 and 6, the frame 4 is spaced apart from the circuit board 21 and includes front and rear frame portions 41, 42 that respectively correspond in position to the free end and connecting end portions 212, 213 of the first surface 211 of the circuit board 21, two spaced-apart side frame portions 43 that interconnects the front and rear frame portions 41, 42, and a coupling portion 44 that is embossed from a side of the rear frame portion 42 proximate to the connecting member 3. In this embodiment, the coupling portion 44 has three through grooves 441, each of which is for the first extending section 321 of a respective one of the elastic arms 32 to extend therethrough, and three coupling blocks 442, each of which is proximate to a front end of a respective one of the through grooves 441 and is coupled to the coupling groove 325 of the respective one of the elastic arms 32. The number of through grooves 441 and the number of the coupling blocks 442 matches that of the elastic arms 32 in this embodiment, but the numbers may vary in other embodiments. The frame 4 is electrically connected to the connecting member 3 via the coupling portion 44.

Each of the coupling blocks 442 defines a coupling thickness (T1, see FIG. 6) in the pressing direction (D3), and the second extending section 322 of each of the elastic arms 32 and the circuit board 21 define a moving thickness (T2, see FIG. 6) therebetween. The coupling thickness (T1) is smaller than the moving thickness (T2). In one embodiment, the pressing direction (D3) is orthogonal to the front-rear direction (D1) and the lateral direction (D2).

Figure 7:
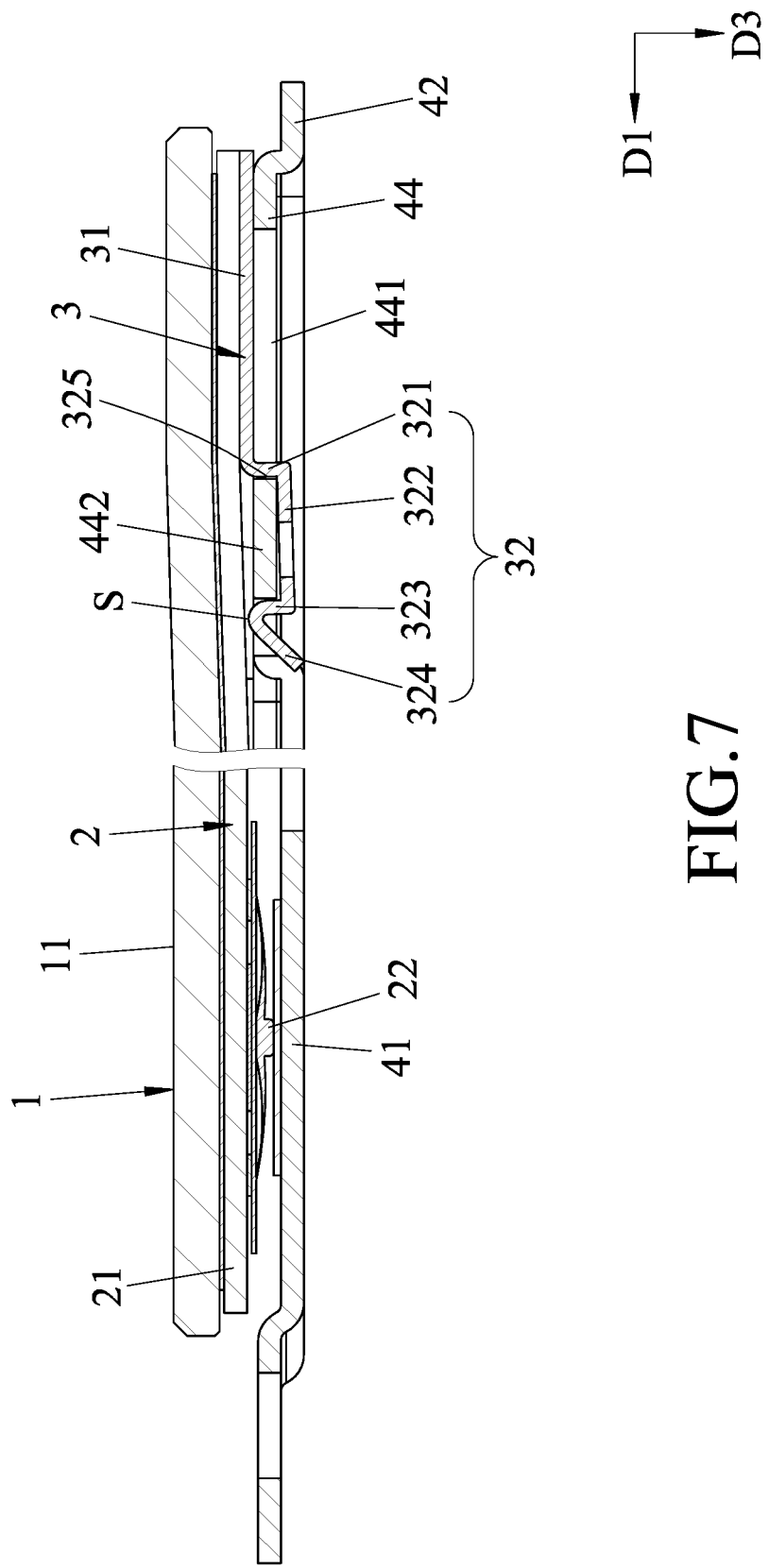
FIG. 7 is a view similar to FIG. 6, illustrating the circuit module in a depressed position.

When a user applies force to the touch input surface 11 in the pressing direction (D3), the circuit module 2 moves relative to the frame 4 from a default position (see FIG. 6) to a depressed position (see FIG. 7).

While the circuit module 2 is in the default position, the free end portion 212 of the circuit module 2 and the front frame portion 41 of the frame 4 are spaced apart in such a way that the pushbutton switch 22 is not depressed by the front frame portion 41. Specifically, the elastic arms 32 are not deformed at this time, and the coupling blocks 442 are steadily coupled to the coupling grooves 325.

When the the circuit module 2 is the the depressed position, the free end portion 212 and the front frame portion 41 are proximate to each other in such a way that the pushbutton switch 22 is depressed, thereby indicating presence of pressure thereon. Since the coupling thickness (T1) is smaller than the moving thickness (T2), the elastic arms 32 would slightly deform at this time, such that the coupling blocks 442 become slightly disoriented to be partially lifted away from being thoroughly mounted to the coupling grooves 325. When the user stops applying the force on the touch input surface 11, the elastic arms 32 are restored back to their original positions, and the coupling blocks 442 are steadily coupled to the coupling grooves 325 once again, such that the circuit module 2 returns to the default position.

Since the connecting member 3 is metallic, it is more stable in comparison to the foam sheet disclosed in the prior art. In addition, the connecting member 3 enables electric connection between the earthing electrodes 23 and the frame 4, such that the earthing electrodes 23, the connecting member 3 and the frame 4 become electrically neutral. Since the frame 4 is annular, it is capable of preventing electromagnetic interference once it is grounded.

To assemble the touch input device properly, the elastic arms 32 of the connecting member 3 are initially and respectively inserted into the through grooves 441 of the coupling portion 44 of the frame 4. Then, the frame 4 is pushed along the front-rear direction (D1) so that the coupling blocks 442 may be guided by the guiding sections 324 of the elastic arms 32 to pass through the assembling gap (S) to be respectively coupled to the coupling grooves 325. No additional resources or tools are needed in the assembling process.

Overall, the metallic characteristics of the connecting member 3 offer longevity and stability to the touch input device, and the design of the coupling mechanism, which utilizes the coupling blocks 442 and the coupling grooves 325, simplifies the assembling process.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A touch input device comprising:
  a base board including a touch input surface on one side thereof;
  a circuit module including
    a circuit board that is connected to and disposed to the other side of said base board opposite to said touch input surface, and that has a first surface facing away from said base board, said first surface having a free end portion and a connecting end portion opposite to said free end portion in a front-rear direction, and a pushbutton switch that is mounted to said free end portion of said circuit board, and that protrudes away from said circuit board in a pressing direction;

a metallic connecting member including a positioning portion that is fixedly mounted to said connecting end portion of said first surface of said circuit board, and at least one elastic arm that is connected to said positioning portion, and that has a first extending section extending from said positioning portion away from said circuit board in the pressing direction, a second extending section extending from said first extending portion toward said free end portion in the front-rear direction, and a third extending section extending from said second extending portion toward said circuit board, said first, second, and third extending sections cooperatively defining a coupling groove that indents away from said circuit board; and an annular, metallic frame spaced apart from said circuit board and including a front frame portion that corresponds in position to said free end portion of said first surface of said circuit board, a rear frame portion that corresponds in position to said connecting end portion of said first surface of said circuit board, two spaced-apart side frame portions that interconnect said front and rear frame portions, and a coupling portion that is embossed from a side of said rear frame portion proximate to said connecting member, and that has at least one through groove for said first extending section of said at least one elastic arm to extend therethrough, and at least one coupling block proximate to a front end of said at least one through groove and coupled to said coupling groove of said at least one elastic arm.

2. The touch input device as claimed in claim 1, wherein said third extending section of said at least one elastic arm and said circuit board define an assembling gap therebetween.

3. The touch input device as claimed in claim 1, wherein said at least one elastic arm of said connecting member further has a guiding section that extends from said third extending section away from said positioning portion of said connecting member and away from said circuit board.

4. The touch input device as claimed in claim 1, wherein said connecting member includes a plurality of said elastic arms that are spaced apart from each other in a lateral direction orthogonal to the front-rear direction.

5. The touch input device as claimed in claim 1, wherein:

said circuit module further includes at least one earthing electrode that is mounted to said connecting end portion;

said positioning portion of said connecting member is fixedly mounted to said connecting end portion via welding to be electrically connected to said at least one earthing electrode; and said frame is electrically connected to said connecting member via said coupling portion.

6. The touch input device as claimed in claim 1, wherein:

said base board, said circuit module, said connecting member, and said frame are arranged in the pressing direction; and said at least one coupling block defines a coupling thickness in the pressing direction, and said second extending section of said at least one elastic arm and said circuit board define a moving thickness therebetween, the coupling thickness being smaller than the moving thickness.

\* \* \* \* \*